Figure 1:
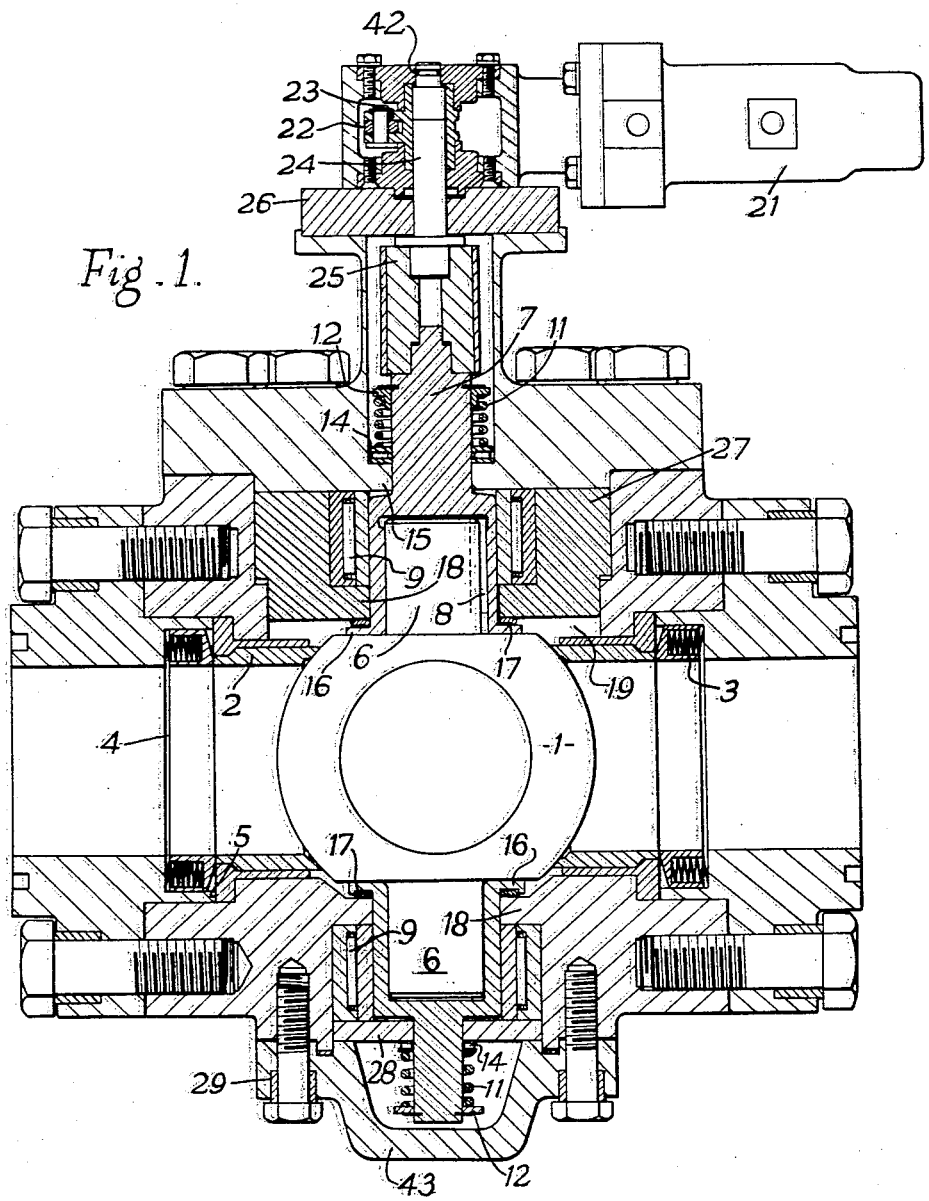

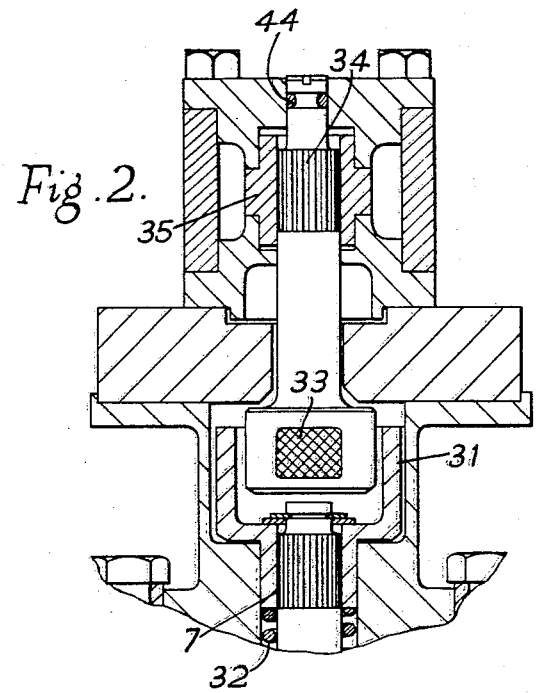
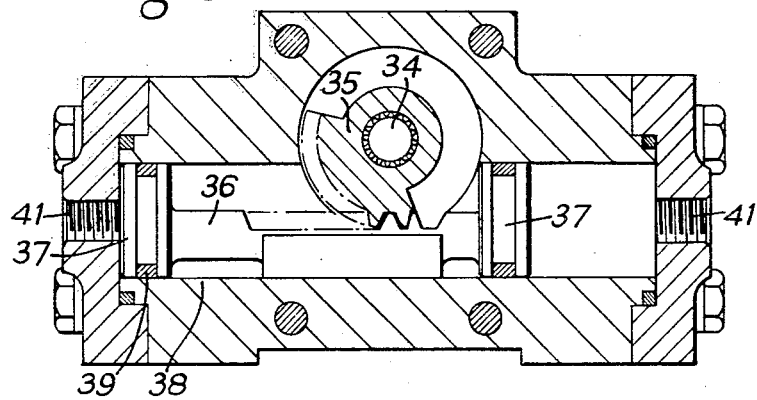

United States Patent Office 3,151,837
Patented Oct. 6, 1964

3,151,837
PLUG COCKS HAVING SPRING BIASED
SHAFT SEALS
Herbert Bentley-Leek, Hereford, England, assignor to
Saunders Valve Company Limited, Cwmbran, England,
a British company
Filed July 25, 1960, Ser. No. 45,145
7 Claims. (Cl. 251—214)

This invention relates to plug cocks intended to deal with fluids which are liable to cause deposition of solids. By way of example liquid oxygen may be mentioned. The passage of this medium through the cock leads to the development of very low temperatures and if there is any moisture present it is frozen into ice. Accordingly if condensation of moisture occurs in the space between the moving parts of the cock then this ices up and it becomes difficult or impossible to turn the plug. This is of particular importance where the cock is remote controlled or operated through a small electric or pneumatic motor.

These difficulties are not to be feared to any great extent on the surface of the plug surrounding the duct which makes contact with seating surfaces in the cock casing. They arise more particularly at the places where the plug is journalled in the casing. There must be at least one such journal on the operating spindle which extends through the casing to the external means for rotating the plug and there is often another journal at the other end of the plug.

According to the present invention there is provided a spring pressed sealing ring located at the plug end of each such journal to check leakage from the surface of the plug over the journal surface, and sealing means to prevent access of the atmosphere to the journal surface.

It should be emphasised that the invention is concerned with preventing leakage into the bearings or to a lesser extent to the outside of the casing and is not concerned with preventing leakage of the medium from the upstream to the downstream side. For this reason a sealing ring is provided even in the case of a journal which is wholly closed over as is commonly the case where such a journal is provided at the opposite end of the plug to the operating spindle.

So far as the operating spindle is concerned this may be slidably keyed to a projection on the plug so that slight axial play between them is possible. Then the spindle is urged in an outward direction, that is to say outward with respect to the casing, by a spring which may be a compression spring acting between a shoulder in a part of the casing and a shoulder formed or secured to the spindle, and the inner end of the spindle has a flange between which and a facing on the inside of the casing the packing is arranged. The axial freedom thus enables the packing ring to be pressed against the cooperating surface in the casing while leaving the plug itself to have its precise axial position determined by its relationship to the casing, in particular to the surface of the casing against which it seats. The spindle may desirably be journalled by a needle roller bearing, the inner race of which fits on the spindle and the outer race in a suitable recess in the casing. If there is a journal at the other end of the plug this also may be formed on a spindle slidably keyed to a projection on the plug and spring urged to press a packing ring against the surface on the inside of the casing in a similar manner to that described for the operating spindle. This spindle for the other end of the plug may also be journalled by a needle roller bearing similarly mounted to that above described. A bolted on cap may cover the projecting end of the spindle upon which the spring acts.

Desirably the plug is spherical. The above described axial freedom of the plug enables it to centre itself in the axial direction in relation to the seatings in the casing, while in the direction of the bore through the plug casing the actual seatings are spring urged so that they can centre themselves in relation to the plug. The seatings are preferably attached to or formed at the ends of tubular members which slide after the fashion of pistons in bores or liners in the cock casing and are spring pressed towards the plug. To permit sliding there must be working clearance for the tubular members and with hard, e.g. metal, seatings the slight transverse play afforded by the clearance is sufficient to ensure that if there is any sticking of the seating to the plug this is broken in tension rather than shear.

At their outer ends these tubular members may be sealed to the casing by diaphragms. The outer margins of the diaphragms may be clamped between bolted on end fittings and flanges on the above mentioned liners, while at their inner margins they may be permanently sealed to the tubular members or simply be firmly pressed against the ends of these tubular members by metal rings through which the spring pressure is applied to provide the seating pressure. There may desirably be a plurality of short helical compression springs disposed all round and lodged in blind bores in the rings.

The material for the various parts will be chosen according to the medium to be controlled. If this is liquid oxygen or some other medium which leads to the development of very low temperatures and the cock is to be power operated there is preferably a coupling between the upper end of the operating spindle and an extension spindle to which the power is applied, this coupling being of a material having a very low heat conductivity so that the power operating device does not have its temperature unduly reduced. It may be an electric motor and gearing of well known kind, or the upper end of this extension spindle may carry a pinion meshing with a rack carrying a pitson at each end, working in a double ended cylinder so that rotation can be imparted by supplying a gas or a liquid under pressure to the appropriate end of the cylinder. The cylinder may be supported by a heat insulating block on an upward extension from the cock casing which surrounds the spring which acts on the cock spindle and the above mentioned coupling to the auxiliary spindle.

In order that the invention may be clearly understood some embodiments thereof will now be specifically described by way of example only with reference to the accompanying drawings in which, FIGURE 1 is a vertical section through a plug cock according to the invention, FIGURE 2 is a fragmental vertical section showing an alternative operating mechanism, and FIGURE 3 is a section on the line III—III in FIGURE 2.

The plug cock shown in FIGURE 1 has a part spherical plug 1 journalled for rotation about its axis. Sleeve-like seatings 2 are urged by springs 3 into abutment with the plug and define the valve ports, whilst diaphragms 4 peripherally clamped in place at 5 serve to prevent leakage on the outside of the seatings 2.

Projections 6 extending axially from the plug are slidably keyed to a spindle 7 by a key 8, to allow slight relative axial movement between the plug and the spindle. The spindles are supported for rotation by needle roller bearing races 9 and are biased outwardly of the cock casing by springs 11 seating between a flange 12 carried upon the spindle and a seating 14 upon the flange 15 of the casing.

The inner end of the spindles 7 are formed with an integral flange 16 and a sealing ring 17 is located between this flange and the casing at 18. The sealing ring 17 is pressed between the flange 16 and the casing 18 and serves to prevent any fluid which has escaped into the space 19 leaking over the journal surface. The sealing ring 17 is desirably of a slightly resilient material which is not detrimentally affected by the fluid in the valve and it has been found that a particularly suitable material is polytetrafluoroethylene. Then if the valve is being used with a fluid such as liquid oxygen any liquid or gas which escapes past the seatings 2 into the space 19 cannot leak further into the journal of the valve. Further as will be explained below entry of atmospheric air is prevented so that no atmospheric moisture has access to the journal and the low temperature of the liquid or the low temperature produced by its evaporation could cause ice to form and the valve to seize.

In the valve shown in FIGURE 1 a power operating device 21, which may be a double acting hydraulic or pneumatic mechanism or an electro-magnetic mechanism of a known kind, is operatively connected to the valve by means of a connecting rod 22 engaging a crank 23 carried upon the spindle 24. In order to prevent this mechanism being cooled to a point where it may ice up or cease to function the spindle 24 is an extension spindle which is operatively connected to the spindle 7 by a block 25 which is made of a material having a very low heat conductivity. This prevents heat loss by conduction along the spindle. The operating mechanism may be further protected by mounting it upon a block 26 of a material having a very low heat conductivity the block 26 being in turn mounted upon the casing. This prevents heat loss by conduction in the casing.

The operating mechanism and the journals may be further protected from extreme cooling by making at least some parts of the cock casing of heat insulating materials. For example the parts 27 and 28 may be made of a suitable material having a low heat conductivity. Also the conduction of heat through bolts holding the assembly together may be minimised by sleeving parts of the bolts, particularly those parts in pressure contact with metal, in sleeves 29 of poor conductivity.

Although the end of the spindle 24 is accessible to the atmosphere inward leakage of atmospheric air along it is prevented by an O-ring 42 lodged in a groove. It will also be clear that the whole mechanism, spindle 7 and bearings 9 are hermetically enclosed so that there can be no inward leakage of moisture which could be frozen into ice at any point where the temperature is low enough and thus ice up the valve and prevent its operation. At the lower end where there is no operating mechanism a hermetic cover 43 is provided.

In FIGURES 2 and 3 an alternative operating mechanism for the valve is shown. The valve spindle 7 is splined at its end to a yoke 31 which is biased outwardly of the valve casing by a spring 32. A block 33 of a material having a very low heat conductivity connects the yoke to an extension spindle 34. The outer end of the extension spindle is splined to a pinion 35 which enmeshes with a rack 36. The rack 36 forms a connecting rod between a pair of plungers 37 sealed in a common cylinder 38 by sealing rings 39. Ports 41 at opposite end of the cylinder 38 allow this to be double acting and allow the valve to be controlled either hydraulically or pneumatically. The plunger and cylinder and the casing in which it is contained are carried upon a block 42 of material having a very low heat conductivity which is in turn carried upon the valve casing.

As in FIGURE 1 the outer end of the extension spindle 34 is sealed by an O-ring 44 with the like effect in conjunction with the hermetic enclosure of all parts of preventing entry of atmospheric moisture and risk of icing up.

I claim:
1. A plug cock including a cock casing, a rotatable plug in said casing, a projection on the plug co-axial with its axis of rotation, a hollow journal slidably keyed on said projection, a flange on the end of said hollow journal at the plug end thereof, a bearing in said casing for said journal open at its outer end so that access can be had to said journal for rotation thereof from outside the casing, a facing formed inside said casing facing said flange, a packing ring located and filling the space between said flange and facing when the flange is closely adjacent the plug, spring means acting axially on said journal urging it outwardly with respect to the casing and thereby holding said packing ring under pressure between said flange and facing, sealing means preventing access of the atmosphere to the journal, a second projection on the plug co-axial with its axis of rotation and diametrically opposite said first mentioned projection, a second hollow journal slidably keyed on the second projection, a second flange on the end of said second journal and the plug end thereof, a second bearing in said casing for said second journal, a second facing formed inside said casing facing said second flange, a second packing ring located and filling the space between said second flange and second facing when the flange is adjacent the plug, second spring means acting axially on said second journal urging it outwardly with respect to the casing and thereby holding said second packing ring under pressure between said second flange and second facing, a hermetic cover preventing access of the atmosphere to said second journal, and third and fourth flanges carried on said journals adjacent the ends opposite said plug ends, said spring means being compressed between said third and fourth flanges and said casing.

2. A plug cock according to claim 1 also including an operating spindle upon which said journal is formed, cock operating means, and a coupling of a material having a very low heat conductivity coupling said operating spindle and operating means, said sealing means being located at the outer end of said operating spindle beyond the operating means.

3. A plug cock according to claim 1 including power operating means for rotating said plug, a block of material having a very low heat conductivity supporting said operating means on the cock casing, and a coupling of a material having a very low heat conductivity coupling said operating means and said plug, said sealing means being located at the outer end of said operating spindle beyond said operating means.

4. A plug cock according to claim 3 wherein the operating means includes an extension spindle carrying a pinion engaged by a rack.

5. A plug cock according to claim 3 wherein the operating means includes an extension spindle carrying a crank engaged by a connecting rod.

6. A plug cock according to claim 1 wherein said journal is journalled in a needle roller bearing.

7. A plug cock according to claim 1 wherein at least a part of the cock casing incorporates material of a very low heat conductivity disposed to reduce the rate of heat transfer between the exterior and interior of the cock.

References Cited in the file of this patent

UNITED STATES PATENTS

| | | |
|---|---|---|
| 353,068 | Janotte | Nov. 23, 1886 |
| 2,734,715 | Knox | Feb. 14, 1956 |
| 2,837,308 | Shand | June 3, 1958 |
| 2,929,606 | Kaiser | Mar. 22, 1960 |
| 2,963,260 | Siravo | Dec. 6, 1960 |
| 2,974,921 | Kaswan | Mar. 14, 1961 |

FOREIGN PATENTS

| | | |
|---|---|---|
| 14,025 | Great Britain | Dec. 30, 1911 |
| 507,878 | Great Britain | June 22, 1939 |
| 84,334 | Sweden | Sept. 17, 1935 |
| 988,840 | France | May 16, 1951 |